(12) United States Patent
Shirotori

(10) Patent No.: US 11,046,259 B2
(45) Date of Patent: Jun. 29, 2021

(54) VEHICLE OIL PAN GUARD

(71) Applicant: TOYOTA JIDOSHA KABUSHIKI KAISHA, Toyota (JP)

(72) Inventor: Kotaro Shirotori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 16/218,640

(22) Filed: Dec. 13, 2018

(65) Prior Publication Data
US 2019/0176720 A1 Jun. 13, 2019

(30) Foreign Application Priority Data
Dec. 13, 2017 (JP) .............................. JP2017-239095

(51) Int. Cl.
| | | |
|---|---|---|
| *F01M 11/00* | (2006.01) | |
| *B60R 13/08* | (2006.01) | |
| *B62D 35/02* | (2006.01) | |
| *B62D 25/20* | (2006.01) | |

(52) U.S. Cl.
CPC ...... *B60R 13/0861* (2013.01); *B62D 25/2072* (2013.01); *B62D 35/02* (2013.01); *F01M 11/0004* (2013.01); *F01M 2011/0012* (2013.01); *F01M 2011/0058* (2013.01); *F01M 2011/0091* (2013.01)

(58) Field of Classification Search
CPC .............. F16N 31/006; B62D 25/2072; B60R 13/0861
USPC ........................................... 180/69.1; 296/38
See application file for complete search history.

(56) References Cited

U.S. PATENT DOCUMENTS

| | | | | | |
|---|---|---|---|---|---|
| 2,931,453 | A | * | 4/1960 | Ingless ................... | F01M 11/04 180/69.1 |
| 3,396,810 | A | * | 8/1968 | Andrews ............... | F16N 31/006 180/69.1 |
| 3,918,542 | A | * | 11/1975 | Murillo ................. | F16N 31/006 180/69.1 |
| 4,084,655 | A | * | 4/1978 | Savron ..................... | B60K 5/00 180/69.1 |
| 4,326,445 | A | * | 4/1982 | Bemiss .................. | B60K 15/00 296/187.07 |
| D265,308 | S | * | 7/1982 | Zimmer, Jr. ................. | 180/69.1 |
| 4,445,584 | A | * | 5/1984 | Kimura ............... | B60R 13/0861 180/69.1 |
| 4,909,355 | A | * | 3/1990 | Ramos .................. | F16N 31/006 123/196 R |

(Continued)

FOREIGN PATENT DOCUMENTS

| | | |
|---|---|---|
| CN | 103153761 A | 6/2013 |
| CN | 106043192 A | 10/2016 |

(Continued)

*Primary Examiner* — Emma K Frick
(74) *Attorney, Agent, or Firm* — Oliff PLC

(57) ABSTRACT

In a vehicle oil pan guard including a guard plate mounted on a support member via a mounting portion such that the guard plate is arranged at a position under an oil pan storing a hydraulic oil for protecting the oil pan from an impact from below, a cover plate different from the guard plate is mounted together with the guard plate via the mounting portion on the support member such that the cover plate closes an opening formed near the guard plate toward a road surface.

8 Claims, 3 Drawing Sheets

(56) References Cited

U.S. PATENT DOCUMENTS

| | | | | |
|---|---|---|---|---|
| 5,501,290 | A * | 3/1996 | Volz | B62D 25/2072 |
| | | | | 180/69.1 |
| 5,992,926 | A * | 11/1999 | Christofaro | B62D 21/02 |
| | | | | 296/204 |
| 6,378,639 | B1 * | 4/2002 | Murray | F16N 31/006 |
| | | | | 180/69.1 |
| 6,726,273 | B2 * | 4/2004 | Kruschhausen | B62D 25/2072 |
| | | | | 180/69.1 |
| 8,028,781 | B2 * | 10/2011 | Fausch | A01D 75/18 |
| | | | | 180/69.1 |
| 8,579,361 | B2 * | 11/2013 | Takeuchi | B62D 35/02 |
| | | | | 296/185.1 |
| 8,668,245 | B2 * | 3/2014 | Kakiuchi | B62D 35/02 |
| | | | | 296/180.1 |
| 8,746,782 | B2 * | 6/2014 | Naoi | B62D 35/02 |
| | | | | 296/193.07 |
| 9,505,446 | B2 * | 11/2016 | Ideshio | B60K 17/00 |
| 10,202,149 | B1 * | 2/2019 | Johnson | B62D 21/02 |
| 10,787,206 | B2 * | 9/2020 | Nagano | B62D 35/02 |
| 10,850,775 | B2 * | 12/2020 | Kato | B62D 21/155 |
| 2013/0181476 | A1 | 7/2013 | Naoi | |
| 2016/0304132 | A1 | 10/2016 | Ideshio et al. | |
| 2019/0009835 | A1 * | 1/2019 | D'Amico | F16B 5/0072 |
| 2019/0152530 | A1 * | 5/2019 | Kato | B62D 25/2072 |
| 2020/0298715 | A1 * | 9/2020 | Murai | B62D 21/11 |

FOREIGN PATENT DOCUMENTS

| | | |
|---|---|---|
| JP | S62-046275 U | 3/1987 |
| JP | 2016-203963 A | 12/2016 |

\* cited by examiner

VEHICLE OIL PAN GUARD

This application claims priority from Japanese Patent Application No. 2017-239095 filed on Dec. 13, 2017, the disclosure of which is herein incorporated by reference in its entirety.

TECHNICAL FIELD

The present invention relates to a vehicle oil pan guard and, more particularly, to a technique of enhancing fuel efficiency of a vehicle and reducing vehicle exterior noises by improving aerodynamic performance of an underfloor portion of the vehicle with a simple method.

BACKGROUND ART

There is known a vehicle oil pan guard having a guard plate mounted on a support member via a mounting portion such that the guard plate is arranged at a position under an oil pan storing a hydraulic oil for protecting the oil pan from an impact from below. A device described in Patent Document 1 is an example thereof and relates to a front-and-rear-wheel drive vehicle having a transfer disposed on an output side of a longitudinally-mounted transmission, and an oil pan guard is mounted on a casing of a power train unit including the transmission, or a frame of a cross member etc., so that the oil pan and parts housed therein are protected from contact with a road surface (rock etc.), flying pebbles, etc. during rough-road running or off-road running. In Patent Document 1, a casing and a cross member of a power train unit correspond to the support member.

PRIOR ART DOCUMENT

Patent Document
Patent Document 1: Japanese Laid-Open Patent Publication No. 22016-203963

SUMMARY OF THE INVENTION

Problem to be Solved by the Invention

A conventional oil pan guard as described above has an opening near a guard plate toward a road surface in some cases. Although an underfloor portion of a vehicle may be provided with an undercover for improving aerodynamic performance, a guard plate made of high-strength material such as metal is necessary to be disposed on a lower portion of the oil pan, and an opening is formed near a mounting portion of the guard plate in some cases. The formation of the opening impairs aerodynamic performance, resulting in degradation of fuel efficiency and deterioration of vehicle exterior noises, and recent stricter requirements for fuel efficiency and vehicle exterior noises has led to requests for improvements thereof. In this regard, it is conceivable that the shapes of the guard plate and the undercover are optimized to cover a portion including the opening; however, since a structure of a vehicle bottom portion is different for each type of vehicle, newly redesigning the optimum shapes of the guard plate and the undercover for each type of vehicle causes a considerable increase in costs.

The present invention was conceived in view of the situations and it is therefore an object of the present invention to enhance fuel efficiency of a vehicle and reduce vehicle exterior noises by closing an opening near the guard plate with a simple method and improving aerodynamic performance of an underfloor portion of the vehicle while a cost increase is suppressed.

Solution to Problem

To achieve the above object, a first aspect of the present invention provides a vehicle oil pan guard including a guard plate mounted on a support member via a mounting portion such that the guard plate is arranged at a position under an oil pan storing a hydraulic oil for protecting the oil pan from an impact from below, wherein a cover plate different from the guard plate is mounted together with the guard plate via the mounting portion on the support member such that the cover plate closes an opening formed near the guard plate toward a road surface.

The support member is a frame of a vehicle such as a cross member, a casing of a transmission etc. provided with the oil pan, etc.

A second aspect of the present invention provides a vehicle oil pan guard comprising: (a) a pair of mounting shaft members; and (b) a guard plate mounted across the pair of mounting shaft members on axial intermediate portions of the mounting shaft members, (c) the vehicle oil pan guard mounted on a support member via both end portions of the pair of mounting shaft members projected from the guard plate as respective mounting portions in a posture in which the pair of mounting shaft members are spaced apart in a horizontal direction such that the guard plate is arranged at a position under an oil pan storing a hydraulic oil for protecting the oil pan from an impact from below, wherein (d) a cover plate different from the guard plate is mounted together with the guard plate via the mounting portions on the support member such that the cover plate closes an opening formed toward a road surface between the pair of mounting portions projected from the guard plate in the same side.

A third aspect of the present invention provides the vehicle oil pan guard recited in the second aspect of the invention, wherein (a) the pair of mounting shaft members is arranged to be spaced apart each other in a vehicle width direction, wherein (b) both end portions of the pair of mounting shaft members projected from the guard plate in vehicle front-rear direction perform as the respective mounting portions, and wherein (c) the cover plate is disposed across the pair of mounting portions such that the cover plate closes at least one opening formed between the pair of mounting portions projected in at least one of vehicle front and rearward directions.

A fourth aspect of the present invention provides the vehicle oil pan guard recited in the third aspect of the invention, wherein (a) a vehicle front side portion and both left and right side portions relative to the guard plate are covered by an undercover different from the vehicle oil pan guard, and wherein (b) the cover plate is disposed such that the cover plate closes the opening formed in a vehicle rear side portion relative to the guard plate.

A fifth aspect of the present invention provides the vehicle oil pan guard recited in any one of the first to fourth aspects of the invention, wherein (a) each of the mounting portions has a mounting bolt vertically disposed in a direction perpendicular to a plane parallel to the guard plate and are mounted on the support member via the mounting bolt, wherein (b) the cover plate is provided with an insertion hole through which the mounting bolt is inserted, and wherein (c) the cover plate is put in a predefined assembled state by arranging the cover plate on the mounting portions such that the mounting bolts are inserted into the insertion holes.

A sixth aspect of the present invention provides the vehicle oil pan guard recited the fifth aspect of the invention, wherein the predefined assembled state is a state in which the cover plate and the guard plate are substantially parallel to each other and overlapped with each other in a boundary portion.

Being substantially parallel means that the cover plate and the guard plate may not strictly be parallel to each other and may be inclined by ±10° or less relative to each other.

A seventh aspect of the present invention provides the vehicle oil pan guard recited in any one of the first to sixth aspects of the invention, wherein the vehicle oil pan guard is disposed on a front-and-rear-wheel drive vehicle including a longitudinally-mounted transmission and a transfer disposed on the output side of the transmission to distribute a drive force to front and rear wheels and wherein the vehicle oil pan guard is disposed at a position under the oil pan for protecting the oil pan which is disposed on a lower portion of the transmission.

Advantageous Effects of Invention

In the vehicle oil pan guard recited in the first aspect of the invention, the cover plate different from the guard plate is mounted together with the guard plate via the mounting portions on the support member such that the cover plate closes the opening formed near the guard plate, so that an improvement in aerodynamic performance of the underfloor portion results in enhanced fuel efficiency and reduced vehicle exterior noises. In this case, it is only necessary to mount the cover plate and the guard plate on the support member by using the mounting portions, and therefore, a conventional guard plate can directly be used as the guard plate, and it is only necessary to prepare the cover plate having an appropriate shape for each type of vehicle, so that the fuel efficiency and the vehicle exterior noises can be improved while a cost increase is minimized.

The vehicle oil pan guard recited in the second aspect of the invention has the guard plate mounted across the pair of the mounting shaft members and is mounted on the support members in a posture in which the pair of mounting shaft members are spaced apart in the horizontal direction and the guard plate is arranged at a position under the oil pan with the mounting portions 50, 52, where the mounting portions 50, 52 are the both end portions of the respective mounting shaft members projected from the guard plate. Further, the cover plate different from the guard plate is mounted together with the guard plate via the mounting portions on the support member such that the cover plate closes the opening formed between the pair of mounting portions projected from the guard plate in the same sides. Therefore, the second aspect of the invention substantially corresponds to an embodiment of the first aspect of the invention, and the same effects as the first aspect of the invention can be obtained.

In the vehicle oil pan guard recited in the third aspect of the invention, the pair of mounting shaft members is arranged to be spaced apart each other in the vehicle width direction, the both end portions of the pair of mounting shaft members projected from the guard plate in the vehicle front-rear direction perform as the respective mounting portions, and the cover plate is disposed across the pair of mounting portions such that the cover plate closes at least one opening formed between the pair of mounting portions projected in at least one of the vehicle front and rearward directions. Therefore, the opening can reliably be closed by the cover plate, so that the aerodynamic performance is improved to properly obtain the effect of enhancing fuel efficiency and reducing vehicle exterior noises.

In the vehicle oil pan guard recited in the fourth aspect of the invention, the undercover covers the vehicle front side portion and both left and right side portions relative to the guard plate, and the cover plate is disposed such that the cover plate closes the opening formed in the vehicle rear side portion relative to the guard plate. Therefore, the underfloor portion is substantially entirely covered by the undercover, the guard plate, and the cover plate, so that the aerodynamic performance is improved to properly obtain the effect of enhancing fuel efficiency and reducing vehicle exterior noises.

In the vehicle oil pan guard recited in the fifth aspect of the invention, the mounting bolt is vertically disposed on the mounting portions, and the cover plate is provided with the insertion hole through which the mounting bolt is inserted, so that the cover plate is put in a predetermined assembled state with respect to the mounting portions by inserting the mounting bolts through the insertion holes. Therefore, the opening can properly be closed by the cover plate, and a mounting work of the oil pan guard including the cover plate can easily be performed.

In the vehicle oil pan guard recited in the sixth aspect of the invention, the cover plate is assembled to the oil pan guard such that the cover plate and the guard plate are overlapped substantially parallel to each other and in surface contact at the boundary portion. Therefore, the opening can reliably be closed by the cover plate, so that the aerodynamic performance is improved to properly obtain the effect of enhancing fuel efficiency and reducing vehicle exterior noises.

The seventh aspect of the present invention relates to the oil pan guard for the front-and-rear-wheel drive vehicle having the transfer disposed on the output side of the longitudinally-mounted transmission, and while the oil pan is properly protected by the guard plate during off-road running or rough-road running, the presence of the cover plate improves the aerodynamic performance, so that the fuel efficiency can be enhanced and the vehicle exterior noises are reduced.

MODES FOR CARRYING OUT THE INVENTION

Figure 1:
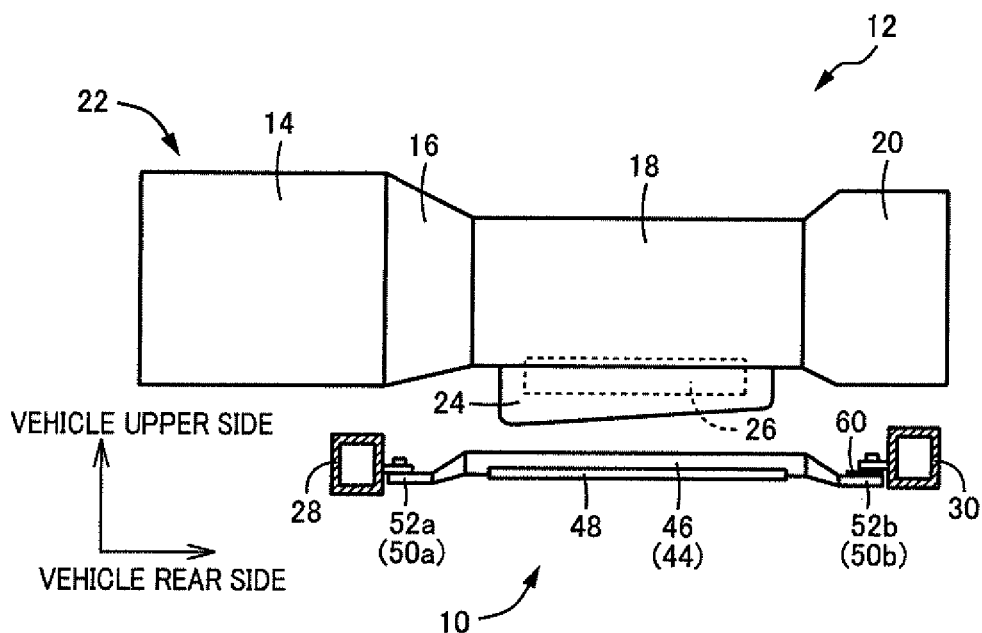
FIG. 1 is a schematic configuration diagram for explaining a power train unit of a front-and-rear-wheel drive vehicle provided with an oil pan guard according to an example of the present invention.

The oil pan guard of the present invention is disposed on, for example, a front-and-rear-wheel drive vehicle capable of off-road running and rough-road running and may also be disposed on normal front-and-rear-wheel drive vehicles, front-wheel drive vehicles, and rear-wheel drive vehicles. The oil pan guard is applicable to an engine drive vehicle equipped with a gasoline engine or a diesel engine as well as various vehicles such as an electric vehicle running by using an electric motor as a drive power source and a hybrid vehicle including an engine and an electric motor as a drive power source. The oil pan is disposed on a lower portion of a power transmission device such as a transmission, for example, and stores a hydraulic oil used for transmission control, lubrication, etc., or may contain a hydraulic oil for cooling an electric motor etc. so that the present invention is applicable to various oil pans.

For the guard plate of the oil pan guard, for example, a flat plate-shaped metal plate material is preferably used; however, the guard plate may be provided with a slit, a lancing slope portion, etc. circulating air for cooling etc. The opening near the guard plate is formed due to the presence of mounting portions projected from the guard plate, for example. The guard plate extends across the pair of mounting shaft members disposed away from each other in a horizontal direction (direction having a horizontal-direction component), for example, and is mounted on the axial intermediate portions of the mounting shaft members and disposed at a position under the oil pan; however, the guard plate may be disposed by using one or three or more mounting shaft members or may have mounting portions fixed by welding etc. to four corners etc. of the guard plate. Furthermore, a portion of the guard plate may be bent to provide a mounting portion, and various other forms are available.

For the cover plate, for example, a flat plate-shaped metal plate material is used; however, since a strength is not required as compared to the guard plate, a cover plate made of a synthetic resin etc. other than metal may be employed. A cover plate having a corrugated plate shape etc. other than a flat plate shape may also be employed. The guard plate also may have a corrugated plate shape. The cover plate may be fixed in advance to the guard plate or the mounting portion of the oil pan guard by a fixing means such as screw fastening, welding, riveting, and crimping, and if the mounting portions of the guard plate are mounted on a support member by screws, the cover plate may be sandwiched between the mounting portions and the support member and fastened together by screws.

If the guard plate is mounted on the pair of mounting shaft members, for example, the pair of mounting shaft members is arranged in a posture in which the mounting shaft members are spaced apart from each other in the width direction (direction having a width-direction component) of the vehicle, and the cover plate is disposed to close the opening formed between the pair of mounting portions projected in at least one of the front and rear directions of the vehicle. The cover plate may be disposed on only one of the front and rear sides of the vehicle, or if openings are formed in both the front and rear sides, cover plates may be arranged for both openings. The pair of mounting shaft members may be arranged apart from each other in the front-rear direction of the vehicle and, in this case, the cover plate is disposed, for example, between a pair of mounting portions projected in at least one of the left and right directions of the vehicle to close an opening formed near the guard plate. The pair of mounting shaft members are disposed in a posture in which the mounting shaft members are substantially parallel to each other, for example, or may be disposed in a posture in which the mounting shaft members are inclined relative to each other depending on a shape of the oil pan, a structure of an underfloor portion of the vehicle, etc. The guard plate is mounted at both side portions thereof on a pair of the mounting shaft members, for example, or may be mounted at two intermediate portions thereof on the pair of the mounting shaft members, and various other forms are available. The guard plate is fixed in advance to the mounting shaft members etc. by a fixing means such as screw fastening, welding, riveting, and crimping.

The pair of mounting shaft members is made of, for example, a round pipe material, and both end portions of the round pipe material are each pressed in a radial direction and flattened to form the mounting portions. In this case, the oil pan guard including the pair of mounting shaft members may easily and inexpensively be formed light in weight. Instead of the round pipe materials, a metal plate material may be rolled into a cylindrical shape and used as the mounting shaft members, or a solid round steel bar material, or a steel bar material or a hollow material having a rectangular cross section, may also be used as the mounting shaft members. Alternatively, separately formed mounting portions may be fixed to end portions of the mounting shaft members on which the guard plate is mounted and the mounting portion is fixed to the support member.

In the underfloor portion of the vehicle, a peripheral portion of the oil pan guard is desirably covered by an undercover, and the cover plate is disposed to close an opening portion that cannot be covered by the guard plate of the oil pan guard and the undercover. The undercover is disposed to cover a vehicle front side portion and both left and right side portions relative to the guard plate, for example, and the vehicle rear side portion is closed by the cover plate; however, a covered position of the undercover is appropriately determined, and an opening portion that cannot be covered by the undercover and the guard plate may be closed by the cover plate. If one opening exists, the opening is desirably closed by one cover plate or may be closed by using multiple cover plates.

Although the mounting portions of the oil pan guard have mounting bolts vertically disposed in a direction perpendicular to a plane parallel to the guard plate, for example, and are mounted on the support member via the mounting bolts, the vertically disposed direction of the mounting bolts is appropriately determined, and the mounting portions may have nut members fixed thereto and may be fixed to the support member by separate mounting bolts, so that a method of fixing by the mounting bolts may appropriately be determined. In addition to screw fastening, the mounting portions may be fixed to the support member by other fixing means such as welding. An elastic body such as a rubber bush may be interposed between the mounting portions and the support member as needed. If the mounting bolts are vertically disposed on the mounting portions, the cover plate may be positioned by using the mounting bolts as a positioning pin, or a positioning portion such as a positioning pin may be disposed separately from the mounting bolts to position the cover plate. A positioning portion may be disposed on the guard plate or the cover plate. The cover plate is disposed on the oil pan guard such that the cover plate is substantially parallel to, and overlapped in a boundary portion with, the guard plate, for example, or may be disposed to confront the guard plate so as to be flush with the guard plate or may have a slight gap with the guard plate. Additionally, the cover plate may be disposed in a posture bent upward or downward, for example, at an angle of about 10° to 30° relative to the guard plate, and various other forms are available.

Example

An example of the present invention will now be described in detail with reference to the drawings. In the following example, the figures are simplified or deformed as needed for description, and portions are not necessarily precisely drawn in terms of dimension ratio, shape, etc.

FIG. 1 is a schematic configuration diagram for explaining a power train unit 12 of a front-and-rear-wheel drive vehicle provided with an oil pan guard 10 according to an example of the present invention. The power train unit 12 is a longitudinally-mounted unit in which an engine 14, a torque converter 16, an automatic transmission 18, and a transfer 20 are disposed in this order from the front side to the rear side of the vehicle, and is housed in a unit casing 22, where the unit casing 22 is formed of multiple case members integrally coupled by bolts etc. The engine 14 is an internal combustion engine such as a gasoline engine and a diesel engine. The automatic transmission 18 is of a longitudinally-mounted type arranged in a posture in which a rotation axis is substantially parallel to a vehicle front-rear direction and is a multi-speed transmission of a planetary gear type, a parallel shaft type, etc. having multiple gear positions different in transmission ratio established according to an engagement/release state of multiple hydraulic friction engagement devices. The transfer 20 distributes a drive force through a differential mechanism such as a planetary gear device to front wheels and rear wheels allowing a differential action, so that the vehicle can run with front/rear-wheel drive. The transfer 20 also includes a high/low switchable auxiliary transmission mechanism and a differential lock mechanism, and the off-road running or the rough-road running can be performed with front-and-rear-wheel driving where differential action between front wheels and rear wheels is locked and a low gear is selected in the auxiliary transmission mechanism, for example. The automatic transmission 18 and the transfer 20 correspond to a power transmission device.

A metal oil pan 24 made up of an iron plate etc. is integrally fixed to the unit casing 22 by bolts etc. in a lower portion of the automatic transmission 18. A hydraulic oil is stored in the oil pan 24 and used for transmission control of the automatic transmission 18, lockup control of the torque converter 16, lubrication of portions including the automatic transmission 18 and the transfer 20, etc. and is pumped up by a mechanical pump etc. and delivered to a valve body 26 etc. The valve body 26 includes multiple solenoid valves etc. used for the transmission control, the lockup control, etc., and is housed inside the oil pan 24. An oil pan guard 10 is disposed at a position under the oil pan 24 housing the valve body 26 etc., to protect the oil pan 24 and parts housed therein (such as the valve body 26) from the impact from below the oil pan 24 due to flying pebbles, contact with a road surface (rock etc.), etc. during off-road running or rough-road running. In this example, the oil pan guard 10 is arranged across a pair of cross members 28, 30 disposed substantially horizontally and along a width direction of the vehicle to form a portion of a frame of the vehicle. The cross members 28, 30 correspond to support members supporting the oil pan guard 10, and the one cross member 28 is disposed on the vehicle front side relative to the oil pan 24 and the other cross member 30 is disposed on the vehicle rear side relative to the oil pan 24.

Figure 2:
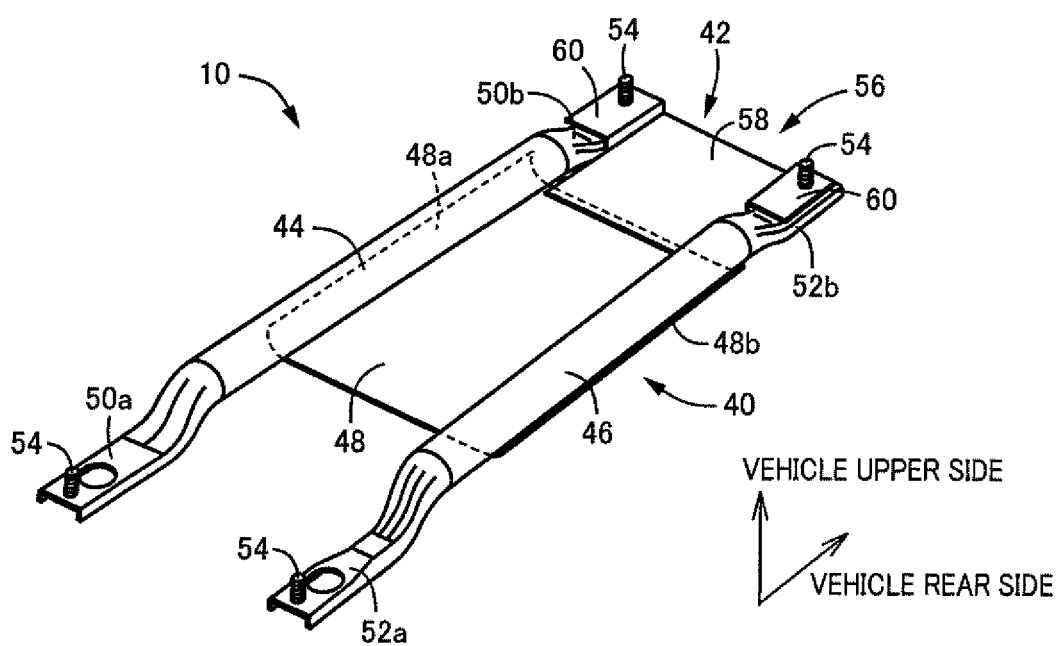
FIG. 2 is a perspective view showing the oil pan guard of FIG. 1 alone.
Figure 3:
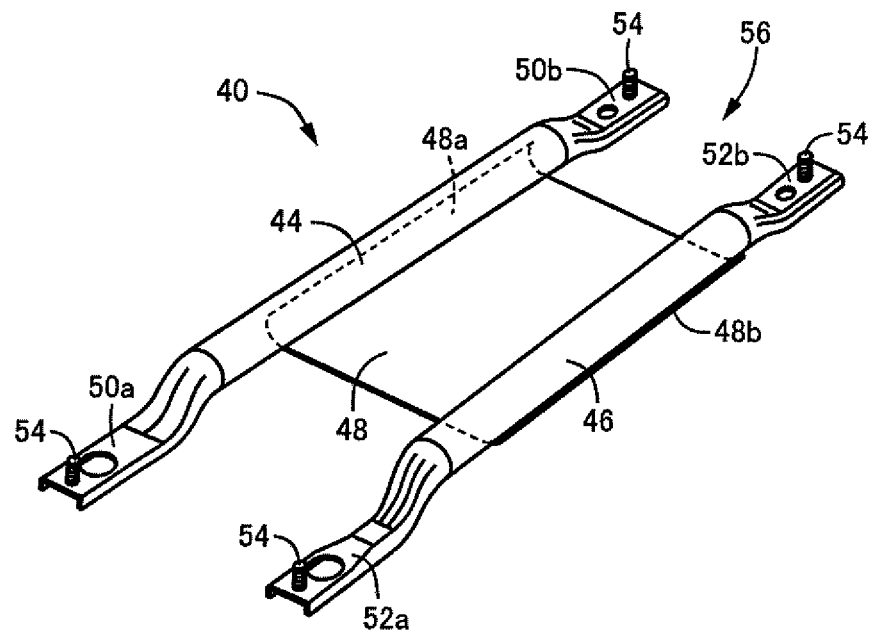
FIG. 3 is a perspective view of a main body of the oil pan guard of FIG. 2.
Figure 4:
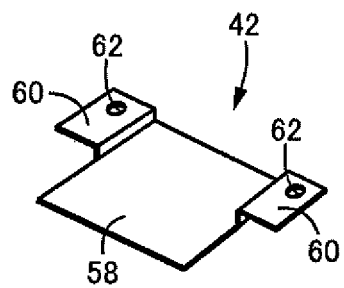
FIG. 4 is a perspective view of a cover plate mounted on the main body of the oil pan guard of FIG. 3.

FIG. 2 is a perspective view showing the oil pan guard 10 alone, FIG. 3 is a perspective view of a main body 40 of the oil pan guard 10, and FIG. 4 is a perspective view of a cover plate 42 mounted on the main body 40 of the oil pan guard 10. That is, the oil pan guard 10 is formed by assembling the cover plate 42 to the main body 40, and the main body 40 has a pair of mounting shaft members 44, 46, and a guard plate 48 fixed to and across the mounting shaft members 44, 46. The pair of mounting shaft members 44, 46 are made of a round pipe material and are spaced apart from each other and substantially parallel to each other in the vehicle width direction and in the horizontal direction with the guard plate 48 fixed to axial intermediate portions of the pair of mounting shaft members 44, 46. The guard plate 48 is a substantially rectangular flat plate-shaped metal plate and is disposed substantially horizontally in contact with lower end surfaces (outer circumferential surfaces) of the mounting shaft members 44, 46, and both side portions 48a, 48b of the guard plate 48 in the vehicle width direction are curved upward along the outer circumferential surfaces of the mounting shaft members 44, 46 and are integrally fixed to the mounting shaft members 44, 46 by welding etc. in a substantially adhered state.

Both axial end portions of the mounting shaft members 44, 46, i.e., portions projected from the guard plate 48 in the vehicle front-rear direction are pressed in a radial direction and flattened to form mounting portions 50a, 50b, 52a, 52b (hereinafter, referred to as mounting portions 50, 52 if not particularly distinguished). The mounting portions 50, 52 are bent in a crank shape and disposed substantially horizontally at positions offset from axial centers of the mounting shaft members 44, 46 to the lower side of the vehicle, such that the mounting shaft members 44, 46 are held at a height not interfering with the oil pan 24. The mounting portions 50, 52 are pressed to be flat, then, both side portions of the respective mounting portions 50, 52 are bent downward at a substantially right angle into a shallow U-shaped (dish-shaped) cross section so that a predetermined bending strength is ensured. Mounting bolts 54 are disposed on the respective mounting portions 50, 52 by welding etc. to project in a direction perpendicular to a plane parallel to the guard plate 48 (substantially horizontal plane), or specifically, upward in a vehicle up-down direction, and the mounting bolts 54 are integrally coupled to brackets etc. disposed on the cross members 28, 30 by using nuts.

Figure 5:
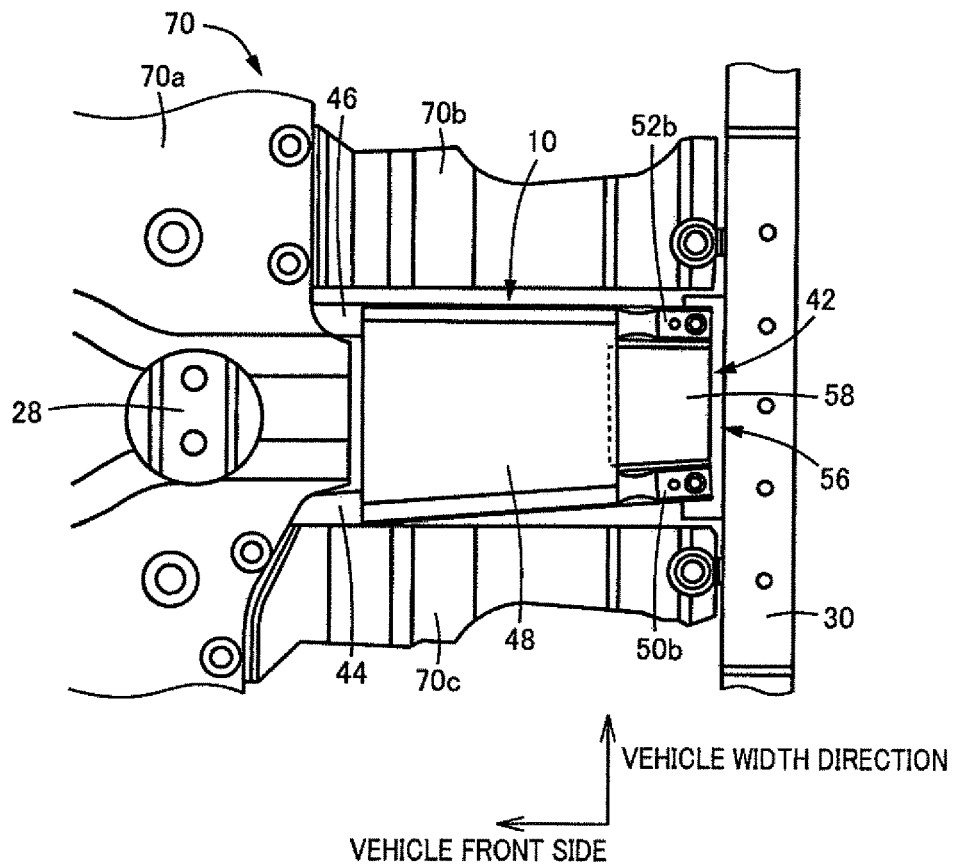
FIG. 5 shows a bottom view of a portion of the front-and-rear-wheel drive vehicle of FIG. 1 in which the oil pan guard is disposed.

The cover plate 42 is provided for closing an opening 56 which opens toward a road surface and formed between the paired mounting portions 50b, 52b projected from the guard plate 48 toward the vehicle rear side and the cover plate 42 is disposed across the mounting portions 50b, 52b. FIG. 5 shows a bottom view of a part of the vehicle from the road surface side in which the oil pan guard 10 disposed with the cover plate 42 is coupled to the cross members 28, 30, and an undercover 70 is disposed in an underfloor portion of the vehicle to cover a peripheral portion of the oil pan guard 10. The undercover 70 includes multiple (in the example, three) plate-shaped members 70a, 70b, 70c made of a synthetic resin etc. and each mounted on cross members 28, 30 etc. The plate-shaped member 70a covers a vehicle front side portion relative to the guard plate 48 and covers the mounting portions 50a, 52a on the vehicle front side of the oil pan guard 10 and a space therebetween. The plate-shaped member 70b covers a vehicle left side portion (the upper side of FIG. 5) relative to the guard plate 48, and the plate-shaped member 70c covers a vehicle right side portion (the lower side of FIG. 5) relative to the guard plate 48. Therefore, a vehicle rear side portion of the guard plate 48, i.e., a portion between the paired mounting portions 50b, 52b is left as the opening 56 which opens toward the road surface, and the opening 56 is closed by the cover plate 42. As is apparent from FIG. 5, the pair of mounting shaft members 44, 46 are not strictly parallel to each other and are slightly inclined to approach each other on the vehicle rear side in accordance with an underfloor structure of the vehicle, and the guard plate 48 and the cover plate 42 are not completely rectangular and have continuously changing dimensions in the vehicle width direction.

The cover plate 42 is formed by bending a single metal plate material and has a substantially rectangular flat plate-shaped closure portion 58 and a pair of flange portions 60 disposed as both side portions of the closure portion 58 offset upward at a vehicle rear side portion of the cover plate 42, and the closure portion 58 is assembled to be fitted between the paired mounting portions 50b, 52b with the pair of the flange portions 60 placed on the mounting portions 50b, 52b. The flange portions 60 are provided with respective insertion holes 62 allowing insertion of the mounting bolts 54. The flange portions 60 are placed on the respective mounting portions 50b, 52b such that the mounting bolts 54 are inserted through the respective insertion holes 62, and the cover plate 42 is thereby positioned in an assembled state in which the closure portion 58 is made substantially horizontal in the same way as the guard plate 48 with a vehicle front side end portion of the closure portion 58 overlapped in a substantially surface contact with the guard plate 48. The vehicle front side end portion of the closure portion 58 corresponds to a boundary portion with the guard plate 48. In such an assembled state, when the oil pan guard 10 is coupled to the cross members 28, 30 via the mounting bolts 54, the flange portions 60 are disposed between the mounting portions 50b, 52b and brackets etc. of the cross member 30 and fastened together, and the cover plate 42 is thereby integrally mounted on the cross member 30 together with the main body 40. If necessary, the cover plate 42 may preliminarily be fixed to the mounting portions 50b, 52b and the guard plate 48 by welding etc.

As described above, the vehicle oil pan guard 10 of this example has the guard plate 48 mounted across the pair of the mounting shaft members 44, 46 and is mounted on the cross members 28, 30 in a posture in which the pair of mounting shaft members 44, 46 are spaced apart in the vehicle width direction and the guard plate 48 is arranged at a position under the oil pan 24 with the mounting portions 50, 52, where the mounting portions 50, 52 are both end portions of the respective mounting shaft members 44, 46 projected from the guard plate 48 in the vehicle front-rear direction. As a result, the guard plate 48 prevents the oil pan 24 from coming into contact with a road surface (rock etc.) or being hit by flying pebbles during off-road running or rough-road running, and the oil pan 24 and parts housed therein (such as the valve body 26) are protected.

On the other hand, the cover plate 42 provided separately from the guard plate 48 is mounted together with the guard plate 48 via the mounting portions 50b, 52b on the cross member 30 to close the opening 56 formed between the paired mounting portions 50b, 52b projected from the guard plate 48 toward the vehicle rear side, so that an improvement in aerodynamic performance of the underfloor portion results in enhanced fuel efficiency and reduced vehicle exterior noises. In this case, it is only necessary to mount the cover plate 42 and the guard plate 48 on the cross member 30 by using the mounting portions 50b, 52b, and therefore, a conventional guard plate can directly be used as the guard plate 48, and it is only necessary to prepare the cover plate 42 having an appropriate shape for each type of vehicle, so that the fuel efficiency and the vehicle exterior noises can be improved while a cost increase is minimized.

Since the cover plate 42 is disposed across the pair of the mounting portions 50b, 52b via the pair of the flange portions 60, the opening 56 between the mounting portions 50b, 52b can reliably be closed. This improves aerodynamic performance to properly obtain the effect of enhancing fuel efficiency and reducing vehicle exterior noises.

Since the undercover 70 covers the vehicle front side portion and both left and right side portions relative to the guard plate 48, and the cover plate 42 is disposed to close the opening 56 formed in the vehicle rear side portion relative to the guard plate 48, the underfloor portion is substantially entirely covered by the undercover 70, the guard plate 48, and the cover plate 42, so that the aerodynamic performance is improved to properly obtain the effect of enhancing fuel efficiency and reducing vehicle exterior noises.

The mounting bolts 54 are vertically disposed on the mounting portions 50, 52, and the flange portions 60 of the cover plate 42 are provided with the insertion holes 62 through which the mounting bolts 54 are inserted, so that the cover plate 42 is positioned in a predetermined assembled state with respect to the mounting portions 50b, 52b by inserting the mounting bolts 54 through the insertion holes 62, and therefore, the opening 56 can properly be closed by the cover plate 42, and a mounting work of the oil pan guard 10 including the cover plate 42 can easily be performed.

Since the cover plate 42 is assembled to the main body 40 of the oil pan guard 10 such that the cover plate 42 and the guard plate 48 are overlapped substantially parallel to each other and in surface contact at the boundary portion, the opening 56 can reliably be closed by the cover plate 42, so that the aerodynamic performance is improved to properly obtain the effect of enhancing fuel efficiency and reducing vehicle exterior noises.

Since a round pipe material is used for the pair of the mounting shaft members 44, 46, and both end portions of the round pipe material are pressed in the radial direction and flattened to form the mounting portions 50, 52, the oil pan guard 10 including the pair of the mounting shaft members 44, 46 can easily and inexpensively be formed light in weight.

Figure 6:
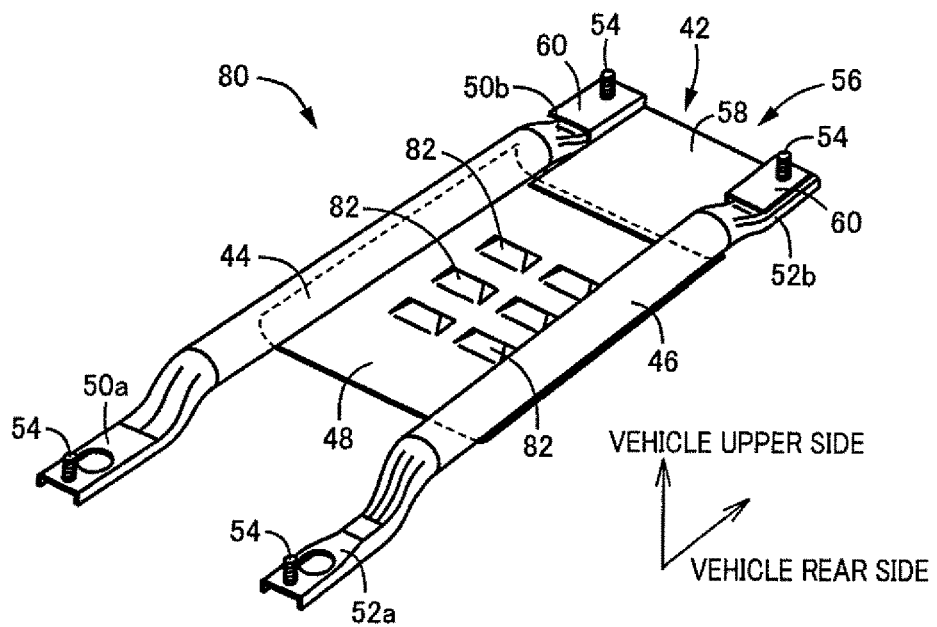
FIG. 6 is a view for explaining another example of the oil pan guard and is a perspective view corresponding to FIG. 2.

In the example, a flat plate material without processing is fixed as the guard plate 48 to the pair of the mounting shaft members 44, 46; however, for example, as in an oil pan guard 80 shown in FIG. 6, the guard plate 48 may be processed to have multiple (in FIG. 6, six) lancing slope portions 82 etc. circulating air for cooling etc. of the oil pan 24.

Although the examples of the present invention have been described in detail with reference to the drawings, these are merely an embodiment, and the present invention can be implemented in variously modified and improved forms based on the knowledge of those skilled in the art.

REFERENCE SIGNS LIST 10, 80: Oil pan guard 18: Automatic transmission (Transmission) 20: Transfer 24: Oil pan 28, 30: Cross member (Support member) 42: Cover plate 44, 46: Mounting shaft member 48: Guard plate 50a, 50b, 52a, 52b: Mounting portion 54: Mounting bolt 56: Opening 62: Insertion hole 70: Undercover

What is claimed is:

1. A vehicle oil pan guard comprising:
a pair of mounting shaft members; and
a guard plate mounted across the pair of mounting shaft members on axial intermediate portions of the mounting shaft members, wherein the vehicle oil pan guard is mounted on a support member via both end portions of the pair of mounting shaft members projected from the guard plate as respective mounting portions in a posture in which the pair of mounting shaft members are spaced apart in a horizontal direction such that the guard plate is arranged at a position under an oil pan storing a hydraulic oil for protecting the oil pan from an impact from below, and a cover plate different from the guard plate is mounted together with the guard plate via the mounting portions on the support member such that the cover plate closes an opening formed toward a road surface between the pair of mounting portions projected from the guard plate in the same side.

2. The vehicle oil pan guard according to claim 1, wherein the pair of mounting shaft members is arranged to be spaced apart from each other in a vehicle width direction, both end portions of the pair of mounting shaft members projected from the guard plate in vehicle front-rear direction are the respective mounting portions, and the cover plate is disposed across the pair of mounting portions such that the cover plate closes at least one opening formed between the pair of mounting portions projected in at least one of vehicle front and rearward directions.

3. The vehicle oil pan guard according to claim 2, wherein a vehicle front side portion and both left and right side portions relative to the guard plate are covered by an undercover different from the vehicle oil pan guard, and the cover plate is disposed such that the cover plate closes the opening formed in a vehicle rear side portion relative to the guard plate.

4. A vehicle power transmission device comprising the vehicle oil pan guard according to claim 2 and an undercover different from the vehicle oil pan guard wherein the undercover covers a vehicle front side portion and both left and right side portions relative to the guard plate, and the cover plate is disposed such that the cover plate closes the opening formed in a vehicle rear side portion relative to the guard plate.

5. The vehicle oil pan guard according to claim 1, wherein each of the mounting portions has a mounting bolt vertically disposed in a direction perpendicular to a plane parallel to the guard plate and are mounted on the support member via the mounting bolt, the cover plate is provided with an insertion hole through which the mounting bolt is inserted, and the cover plate is put in a predefined assembled state by arranging the cover plate on the mounting portions such that the mounting bolts are inserted into the insertion holes.

6. The vehicle oil pan guard according to claim 5, wherein the predefined assembled state is a state in which the cover plate and the guard plate are substantially parallel to each other and overlapped with each other in a boundary portion.

7. The vehicle oil pan guard according to claim 1, wherein the vehicle oil pan guard is disposed on a front-and-rear-wheel drive vehicle including a longitudinally-mounted transmission and a transfer disposed on the output side of the transmission to distribute a drive force to front and rear wheels, and the vehicle oil pan guard is disposed at a position under the oil pan for protecting the oil pan which is disposed on a lower portion of the transmission.

8. A vehicle power transmission device comprising the vehicle oil pan guard according to claim 1, a longitudinally-mounted transmission, and a transfer to receive a drive force from output of the transmission and to distribute the drive force to front rear wheels, wherein, the oil pan is disposed on a lower portion of the transmission, and the vehicle oil pan guard is disposed at a position under the oil pan such that the vehicle oil pan guard protects the oil pan.

\* \* \* \* \*